United States Patent [19]
Paul

[11] Patent Number: 5,310,019
[45] Date of Patent: May 10, 1994

[54] TWO PART TREE STAND

[76] Inventor: Donald L. Paul, 9559 Foley La., Foley, Ala. 36535

[21] Appl. No.: 837,213

[22] Filed: Feb. 18, 1992

[51] Int. Cl.⁵ ............................................. A47F 3/026
[52] U.S. Cl. ..................................... 182/187; 182/135
[58] Field of Search .................. 182/187, 188, 133–136

[56] References Cited

U.S. PATENT DOCUMENTS

| | | | |
|---|---|---|---|
| 3,856,111 | 12/1974 | Baker | 182/135 |
| 3,944,022 | 3/1976 | Ming | 182/187 X |
| 4,168,765 | 9/1978 | Ferguson | 182/187 X |
| 4,230,203 | 10/1980 | Sweat et al. | 182/187 X |
| 4,595,079 | 6/1986 | Shope | 182/187 |
| 4,596,309 | 6/1986 | Jenson | 182/187 |
| 4,708,221 | 11/1987 | Kubiak | 182/187 |
| 4,726,447 | 2/1988 | Gibson et al. | 182/187 |
| 4,819,763 | 4/1989 | Grote | 182/187 |
| 4,890,694 | 1/1990 | Williams | 182/187 |
| 4,989,766 | 2/1991 | Lewallyn et al. | 182/187 X |
| 5,090,505 | 2/1992 | Amacker | 182/187 |

FOREIGN PATENT DOCUMENTS 2627175  8/1989  France ............................ 182/187

*Primary Examiner*—Alvin C. Chin-Shue
*Attorney, Agent, or Firm*—Gregory M. Friedlander

[57] ABSTRACT

An improved tree stand incorporating two part design having improved carrying capability, adjustable shooting rest bar designed for quiet adjustment, retractable climbing and mounting studs, improved foot straps and improved adjusting means for climbing tree wrapping arm comprising wingnuts with pivoted attachments to a leader attached to fixed bolts in the tree wrapping arms.

7 Claims, 5 Drawing Sheets

TWO PART TREE STAND

BACKGROUND OF THE INVENTION

This invention relates to tree stands.

More particularly, the invention relates climbing tree stands.

PRIOR ART

Two part tree stands are known in the prior art.

The prior art shows tree stands having seats with various degrees of adjustability utilizing pins mounted on sliding arms, see Untz U.S. Pat. Nos. 4,417,645; 4,452,338; Williams, U.S. Pat. Nos. 4,890,694; 4,802,552 and other patents sited therein. The need for spikes for climbing has been both cited as a necessary safety feature and as a potential danger to trees and spikes are therefore well known as a part of the prior art and a problem associated with the prior art. A major question comes where the user finds himself in need of additional traction and the spikes have not been utilized due to attempts at tree conservation.

The use of solid part tree wrapping bands are also known with or without gripping members. The adjustment of these members is typically a very serious problem. One method of addressing this problem has been to mount pins utilizing biasing springs as in U.S. Pat. No. 4,890,694 FIG. 12 item 136, and FIG. 9 item 82. These adjustments are necessary in order to provide for varying diameters of trees and to allow adjustment after the different portions are in place. These fail to completely release the tree wrapping arms and therefore tend to interfere with full adjustability.

The use of foot straps is also known in the art. These foot straps serve the purpose of easing climbing by allowing the user to pull the bottom portion up during the climbing process. One of the problems with existing foot straps lies in the difficulty of using or disengaging the foot straps as the user moves around or climbs. Existing foot straps are too loose or too tight. This can be particularly dangerous where a foot slips out of the strap while climbing.

Also known in the art are gun rests. Those available in the prior art are particularly noisy and not easily adjusted for quick use. Some prior art applies to gun rests those do not address this problem in tree stands.

Typically, in a situation where a hunter is using a stand, the hunter may move to a site before the sun comes up and wait for hours so as not to disturb the environment. A gun rest serves the purpose of supporting the gun in a position close to that desired for shooting. The present invention incorporates a gun rest. Because a change in the hunter's sitting position or the target area, the hunter, already in a precarious position, may find that he must quietly adjust the gun rest or lose the benefit of the gun rest.

GENERAL DISCUSSION OF THE INVENTION

The present invention provides for a shooting rest bar which is easily adjusted. The bar is constructed using steel arms. The bar passes through a nylon tension adjuster further described as a threaded sleeve which is provided with spacing and a cap with cooperating treads which can be tightened onto the sleeve. The steel arms move through the threaded sleeves and caps when the sleeves and caps are loosened from each other allowing for adjustment. Nylon is used for maintaining silence. When the threaded sleeves are tightened to the caps, the spacing, typically in the form of slits, is reduced so that the movement of the arms through the sleeves is restricted. This allows for quick and quiet control of the height and position of the shooting rest bar.

Retractable climbing studs are put in place in the props which fit against the tree. This allows for the retraction or extension of the climbing studs during the climbing stage or waiting stage of the hunt using the climbing hunting stand.

Foot straps are provided with an elastic band extending behind where the ankles fit within the straps. These straps are continuous along the ankles and serve to hold the hunters feet within the straps. A single intervening eye hook separates the elastic band into sections behind each foot. On either side of the hook or eyehole bolt the elastic band is equipped with a pull tab. This pull tab allows for the elastic band to be stretched behind one ankle merely by pulling on the pull tab.

The invention also utilizes free swinging wing-nut and bolt type attachments for fixing the position of a sturdy bar type climbing part described herein as the swing arm. The wing-nuts are detachable from one or more bolts which are fixed into the swing arm. The wing-nuts are fixed in approximate location by a flexible leader by way of a pivoting member attached to the wing nuts.

A further element of the present stand is a pocket below the seat and gun rest which serves, along with the positioning of the other elements set forth above, to have all of the adjustments easily accessible to the user of the tree stand.

It is, therefore, an object of this invention to provide an improved tree stand.

It is a further object to provide a tree stand having an improved gun rest.

It is a further object of the invention to provide a tree stand having retractable climbing studs.

It is a further object of the invention to provide for an improved foot anchoring mechanism in the form of an elastic band having pull straps.

It is a further object of the invention to provide a tree stand which is easily utilized and has all of the adjustable parts easily accessed by the user.

These and other objects and improvements of the invention described herein will become better seen from the drawings attached hereto and from the following detailed description.

BRIEF DESCRIPTION OF THE DRAWINGS

For a further understanding of the nature and objects of the present invention, reference should be made to the following detailed description taken in conjunction with the accompanying drawings in which like parts are given like reference numerals and wherein.

DETAILED DESCRIPTION OF THE PREFERRED EMBODIMENT

Figure 1:
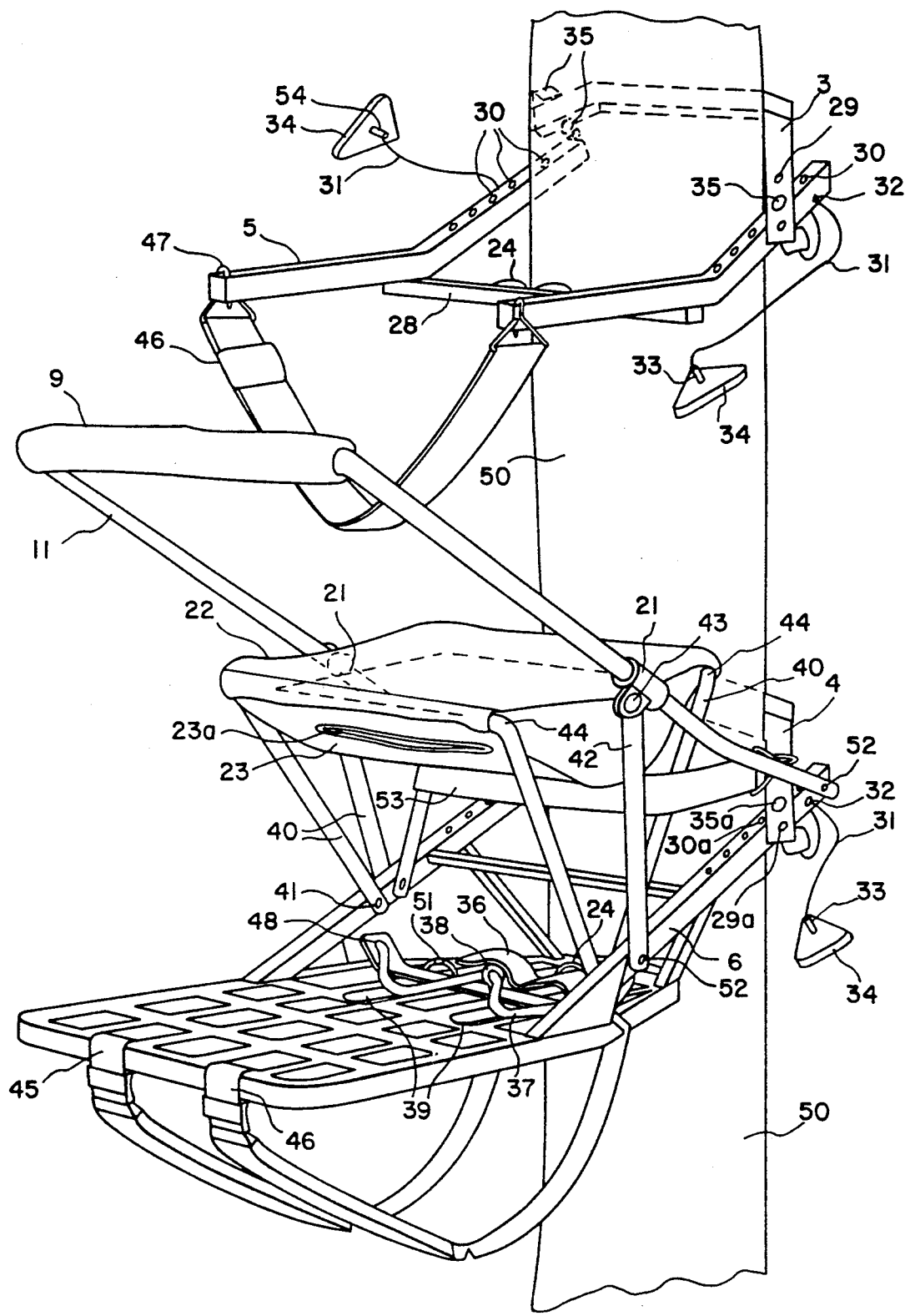
FIG. 1 is a plan view of the invention in place on a tree.

As can best be seen by reference to FIG. 1, the tree stand comprises two major sections. The first of these sections is the upper portion referred to as the hand climber 1. The lower section is referred to as the foot climber 2.

The hand climber 1 comprises a hand climber swing arm 3 and a hand climber primary arm 5. The hand climber primary arm extends forward to accept safety strap hooks 47 for safety strap 46. The hand climber primary arm 5 defines one or more arm holes 30 which receive bolt 35 which is set into one of the holes 29 in the swing arm. Wing nut 34 is used to secure bolt 35. The bolt 35 may be welded in place on the swing arm 3 or the swing arm 3 may have threaded holes 29 to receive the bolt 35 which is then fixed in place by the cooperating threads 54 of wing nut 34. The threads 54 are located within the wing nut 34 opposite pivot 33.

Wing nut 34 is attached by way of pivot 33 to leader 31. Leader 31 is attached to the hand climber primary arm 5 at 32 so that the wing nut 34 can be disengaged without losing the wing nut 34. Hand climber swing arm 3 also has swing arm holes 29 which can be threaded or have bolts 35 welded in place. The bolt 35 in swing arm 3 may be aligned with the main arm holes 30 so that the swing arm 3 and primary arms may be joined. The plurality of hole 30 allows for the width of the opening defined by the joining of the swing arm 3 and primary arm 5 to be varied for trees of various widths.

The primary arm 5 and main arm 6 are equipped with a prop brace 28 on which a climbing prop 24 is located. This climbing prop 24 can be fitted with a retractable stud 25 as discussed in more detail below and as shown on FIG. 2.

Figure 2:
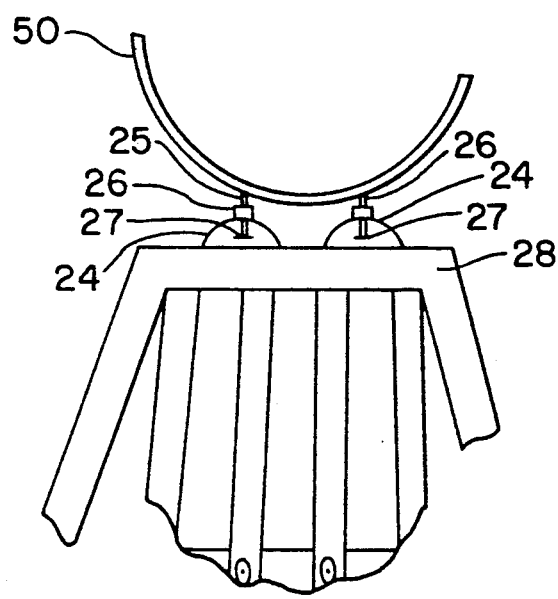
FIG. 2 is a detail view of the retractable stubs shown in FIG. 1.

FIG. 2 shows the prop 24 and retractable stud 25 as used on the base 49. Studs 25 are threaded and cooperate with threads in bolt 26 which lies over a hole drilled through the prop 24. Prop 24 is mounted to base 49 by way of the forward most portion of the base 49 which comprises a prop brace 28. The rear of each stud 25 is equipped with a stud adjustment 27 for turning the stud 25. In this way the stud 25 may be extended or retracted. The tip of the stud 25 is shown in contact with a tree 50 in this embodiment. The studs 25 may be used for climbing and retracted when the stand is in place or may be extended when in place and not used for climbing to avoid injury to the tree 50. Studs 25 may be similarly place on the prop 24 of the hand climber 1.

The foot climber 2 comprises a foot climber base 49 from which a foot climber main arm 6 extends. This main arm 6 is also equipped with one or more main arm holes 30. There is a foot climber swing arm 4 which has one or more swing arm holes 29 to receive a bolt 35a on either side. The foot climber main arm 6 and foot climber swing arm 4 cooperate like the hand climber swing arm 3 and hand climber primary arm 5. The foot climber main arm 6 is attached to a leader 31 which is in turn attached to a pivot 33 which is, in turn, attached to a wing nut 34 for securing the main arm 6 to the swing arm 4 in a manner identical to that used on the hand climber 1. The foot climber 2 has one or more holes 29a on either side of the foot climber swing arm 4 for mounting bolt 35a. The foot climber 2 has holes 30a to receive bolt 35a on either of two main arms 6.

The foot climber 2 is attachable to the feet of the user at the base 49 by way of adjustable foot straps 36. The foot straps 36 are adjustable for a tighter or looser fit by having buckles 51 which receive either end of the straps 36. These foot straps 36 are attached to the base 49. The users foot is also held in place by an elastic band 37 running generally behind the straps 36. Elastic band 37 is held in place by a band holder 48 which is a metal strip running along the width of the base 49. The elastic band 37 runs through an eye hole bolt 38 which is behind and between the foot straps 36 and is mounted onto the base 49.

The eye hole bolt 38 separates the elastic band 37 into a section behind the left foot and a section behind the right foot. Each of these sections has a pull tab 39 attached so that the user may pull back the elastic band 37 to insert or release a foot easily.

The main arm 6 serves as a mounting for a seat 22. Seat 22 is held on seat pivots 44 which hold the seat to a plurality of seat arms 40 which are mounted on seat arm pivots 41. In this way the seat 22 may be folded down onto the base 49 for transporting. When the seat 22 is lifted it is held in place by seat belt 53. The seat 22 defines a pocket 23 which may be shut by way of a zipper 23(a). This seat 22 is positioned directly below the gun rest pad 9 for easy access.

The stand defined in this specification provides for a gun rest comprising two gun rest arms 7 attached by gun rest pivots 8 to the foot climber main arm 6. A tension adjuster 21 is held by way of gun rest support arm upper pivot 43 to the gun rest support arm 42 which is in turn attached to foot climber main arm 6 by way of lower pivot 52. This arrangement provides that the gun rest arms 7 must move through the tension adjustment 21 to rise or fall. When the tension adjustment 21 prevents the movement of the arms 7, the invention is held fixed in place.

Figure 6:
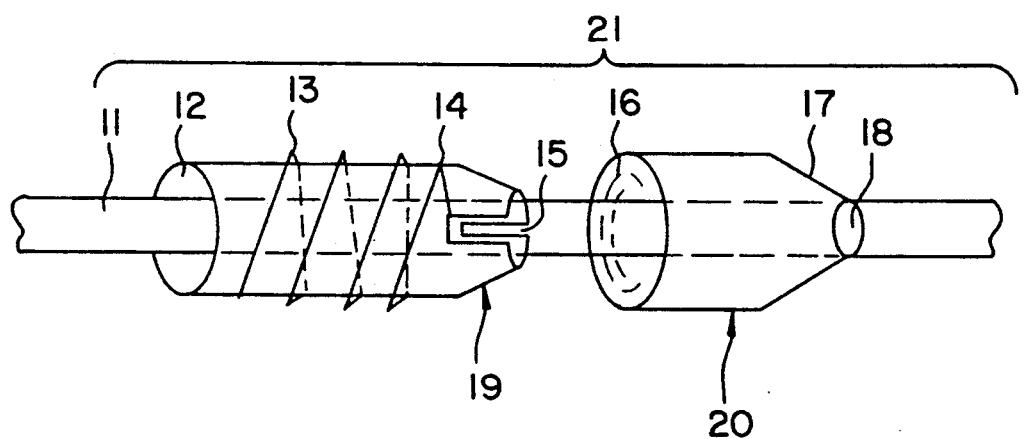
FIG. 6 is a detail view of the tension adjuster for the gun rest.

As can best be seen by reference to FIG. 6, gun rest arm 11 passes through the tension adjuster 21. The position of the gun rest pad 9 is thereby controlled. The tension adjuster 21 consists of a sleeve 19 having a rear opening 12 and a forward opening 15. The sleeve 19 has exterior threads 13 which correspond to and cooperate with interior threads 16 on the cap 20 which is the second part of the tension adjuster 21. The forward opening lies at the end of a slanted portion of the sleeve. Two slits 15 are defined by the forward portion of the sleeve so that the forward portion 15 may be compressed to put tension on the gun rest arm 11. This tension is applied when the forward portion of the sleeve is screwed into the cap 20 which slants downward to cause this effect. In the preferred embodiment, the cap 20 can be turned while the sleeve 19 is held in place by pivot 43 shown on figure 1 so that it may be easily reached by the user who is sitting with his back to the tree 50 and his front to the gun rest bar 9.

Figure 3:
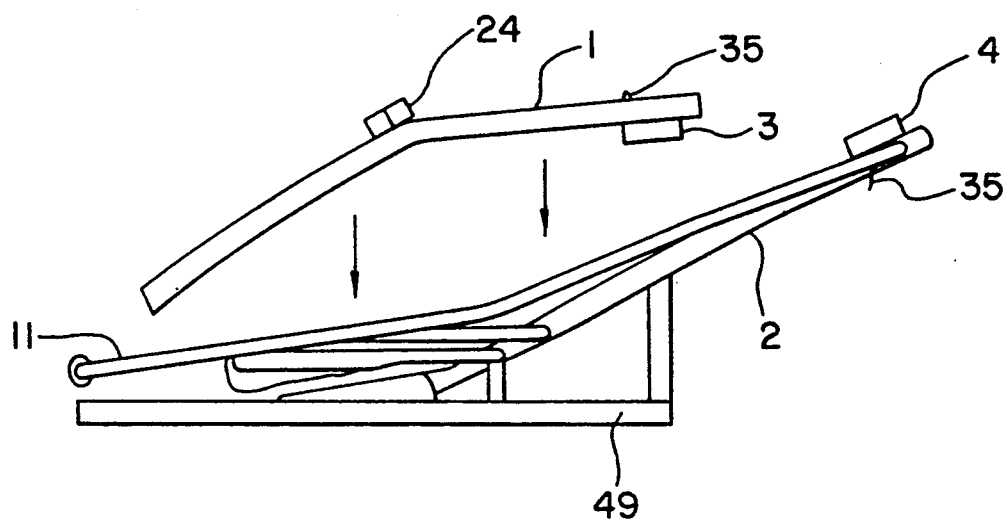
FIG. 3 is a side view of the folded tree stand showing the interaction of the two main parts.
Figure 4:
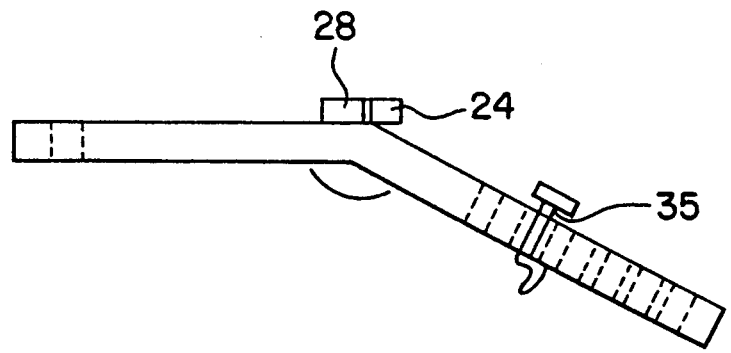
FIG. 4 is a cross sectional view of the hand climber forming a portion of the tree stand.
Figure 5:
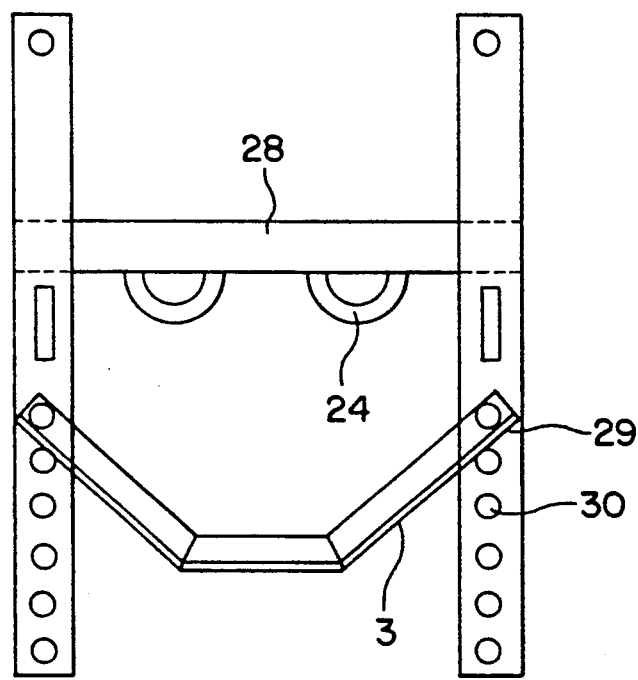
FIG. 5 is a plan view of the hand climber.

FIG. 3 shows that when the seat 22 and gun support 9 are fully folded the base 49 and foot climber main arm 6 form an angle of more than 90 degrees. The pocket between the two main arms 6 can receive the hand climber 1. The hand climber primary arm 5 is bent at a similar angle to that formed by the base 49 and main arm 6. The hand climber 1 is more narrow than the distance between the main arms 6 so that the hand climber 1 may be packed within the foot climber 2 for transporting.

I claim:

1. A tree stand having a base comprising;

(a) a gun rest support arm pivotally connected to said base by a pivot;
(b) a means for maintaining the position of said support arm to said base attached to said pivot and wherein the means for maintaining the position of said support arm further comprises a means for adjusting tension for restricting the movement of the support arm and wherein the means for adjusting tension further comprises;
  (a) a sleeve having exterior threads said sleeve encircling the support arm;
  (b) a cap having interior threads for cooperating with the sleeve thread said cap defining a reduced diameter at a point farthest from the sleeve so that when the sleeve is threaded into the cap, the diameter of the sleeve is reduced.

2. The tree stand of claim 1 wherein the sleeve further defines at least one slit having a width at the end nearest the cap so that the width of the slit is reduced as the diameter of the sleeve is reduced so that the sleeve tightens on the support arm as the cap is tightened on the sleeve.

3. The tree stand of claim 2 wherein the support arm further comprises a second pivot connected to the base and aligned to move with the first pivot so that the movement of the support arm is restricted to a raised or lowered position.

4. The tree stand of claim 1 wherein the tree stand further comprises a seat attached next to the support arm and wherein the cap is adjacent to the seat so that it may be adjusted by someone sitting in the seat.

5. The tree stand of claim 4 wherein the tree stand comprises at least two support arms and further comprising a gun rest lying between the support arms.

6. The invention of claim 5 wherein the gun rest is padded.

7. The tree stand of claim 5 wherein the seat further comprises a pocket below the seat facing the gun rest so that the seat pocket may be reached while a gun is rested and held on the gun rest.

* * * * *